(12) United States Patent
Fletemier et al.

(10) Patent No.: US 6,364,976 B2
(45) Date of Patent: Apr. 2, 2002

(54) METHOD OF MANUFACTURING LAMINATED STRUCTURES WITH MULTIPLE DENIER POLYESTER CORE FIBERS, RANDOMLY ORIENTED REINFORCEMENT FIBERS

(75) Inventors: Todd Fletemier, Gowen, MI (US); Robert Ette, O'Fallon, MO (US); Richard Long, Lincoln Park, MI (US)

(73) Assignee: Findlay Industries, Inc., Troy, MI (US)

( * ) Notice: Subject to any disclaimer, the term of this patent is extended or adjusted under 35 U.S.C. 154(b) by 0 days.

(21) Appl. No.: 09/729,232

(22) Filed: Dec. 4, 2000

Related U.S. Application Data

(62) Division of application No. 09/156,106, filed on Sep. 18, 1998, now Pat. No. 6,156,682.

(51) Int. Cl.[7] .......................... B32B 27/12; B32B 31/06; B32B 31/08
(52) U.S. Cl. ...................... 156/62.2; 156/148; 156/279; 156/309.6; 156/324; 264/112
(58) Field of Search ............................... 156/62.2, 148, 156/279, 309.6, 324; 264/112, 113

(56) References Cited

U.S. PATENT DOCUMENTS

| | | | |
|---|---|---|---|
| 2,765,250 A | | 10/1956 | Williams |
| 2,768,026 A | | 10/1956 | Stephens et al. |
| 3,046,173 A | | 7/1962 | Copeland |
| 3,082,143 A | | 3/1963 | Smith |
| 3,264,165 A | * | 8/1966 | Stickel |
| 3,467,572 A | | 9/1969 | Ahramjian |
| 3,506,532 A | | 4/1970 | Bock et al. |
| 3,531,367 A | | 9/1970 | Karsten |
| 3,556,922 A | | 1/1971 | Green et al. |
| 3,620,906 A | | 11/1971 | Hannes |
| 3,664,905 A | | 5/1972 | Schuster |
| 3,867,240 A | | 2/1975 | Doerfling |
| 3,975,565 A | | 8/1976 | Kendall |
| 4,002,367 A | | 1/1977 | Thomas |
| 4,059,660 A | | 11/1977 | Roth et al. |
| 4,119,749 A | | 10/1978 | Roth et al. |
| 4,139,591 A | | 2/1979 | Jurisch |
| 4,242,398 A | | 12/1980 | Segawa et al. |
| 4,256,797 A | | 3/1981 | Stamper et al. |
| 4,445,954 A | | 5/1984 | Adams et al. |
| 4,463,043 A | | 7/1984 | Reeves et al. |
| 4,474,846 A | | 10/1984 | Doerer et al. |
| 4,476,183 A | | 10/1984 | Holtrop et al. |
| 4,489,126 A | | 12/1984 | Holtrop et al. |

(List continued on next page.)

*Primary Examiner*—Sam Chuan Yao
(74) *Attorney, Agent, or Firm*—Calfee, Halter & Griswold LLP

(57) ABSTRACT

A laminated panel-type structure particularly suited for vehicle interior applications such as headliners and door panels has a multiple denier polyester fiber core and randomly oriented structural reinforcing fibers. The laminated structure has superior sound attenuation properties resulting from a core of intertwined polyester fibers of differing deniers, with preferably relatively larger denier fibers on exterior areas of the core and some bicomponent fibers, short non-woven reinforcing fiber strands which are randomly attached and intertwined with the core on opposing major sides of the core, an impervious polymer film with a low melt layer which retains the reinforcing fibers against one side of the core and is attached to a scrim layer, and a polymer web on an opposite side of the core which retains the reinforcing fiber strands on the opposing major side of the core and to which a cover stock is applied. The invention further includes a method of manufacturing the laminated structure wherein the various layers are sequentially unfurled from spools, passed through nip rollers at points of various subcombinations of materials and layers, the reinforcing fiber strands are randomly distributed on to the carrying layers from hoppers or directly from a fiber chopping device, and the completed laminated structure is cut and molded.

5 Claims, 2 Drawing Sheets

U.S. PATENT DOCUMENTS

| | | |
|---|---|---|
| 4,514,455 A | 4/1985 | Hwang |
| 4,521,477 A | 6/1985 | Kiss |
| 4,526,831 A | 7/1985 | Hatchadoorian et al. |
| 4,531,994 A | 7/1985 | Holtrop et al. |
| 4,568,581 A | 2/1986 | Peoples, Jr. |
| 4,579,774 A | 4/1986 | Kuwazuru et al. |
| 4,584,232 A | 4/1986 | Frank et al. |
| 4,608,104 A | 8/1986 | Holtrop et al. |
| 4,680,219 A | 7/1987 | Vernois et al. |
| 4,695,501 A | 9/1987 | Robinson |
| 4,729,917 A | 3/1988 | Symdra et al. |
| 4,756,955 A | 7/1988 | Rias |
| 4,778,717 A | 10/1988 | Fitchmun |
| 4,780,359 A * | 10/1988 | Trask et al. ............... 428/234 |
| 4,784,898 A | 11/1988 | Raghava |
| 4,798,756 A | 1/1989 | Fukushima et al. |
| 4,798,763 A | 1/1989 | Kia |
| 4,840,832 A | 6/1989 | Weinle et al. |
| 4,851,283 A | 7/1989 | Holtrop et al. |
| 4,879,170 A | 11/1989 | Radwanski et al. |
| 5,031,457 A | 7/1991 | Kline |
| 5,037,690 A | 8/1991 | van der Kooy |
| 5,272,000 A | 12/1993 | Chenoweth et al. |
| 5,459,291 A | 10/1995 | Haines et al. |
| 5,462,793 A | 10/1995 | Isoda et al. |
| 5,501,898 A | 3/1996 | Fottinger et al. |
| 5,545,450 A | 8/1996 | Andersen et al. |

\* cited by examiner

US 6,364,976 B2

METHOD OF MANUFACTURING LAMINATED STRUCTURES WITH MULTIPLE DENIER POLYESTER CORE FIBERS, RANDOMLY ORIENTED REINFORCEMENT FIBERS

This application is a division of Ser. No. 09/156,106 filed on Sep. 18, 1998 now U.S. Pat. No. 6,156,682.

FIELD OF THE INVENTION

The present invention pertains generally to molding of composite materials including fibers and plastics and, more particularly, to molding of structural and acoustical panels which include glass fibers and thermosetting resins.

BACKGROUND OF THE INVENTION

Composite material panels are used in many different applications, including automobiles, airplanes, housing and building construction. The properties sought in such panels are strength, rigidity, sound absorption, and heat and moisture resistance. One application of such panels which has been especially challenging is automobile headliners and other automotive interior panels. Many different types of laminates and laminated composites have been tested and produced for use in automobiles. Some headliners have a core of fiberglass fibers and a polyester resin. Others have been manufactured from a core of open cell polyurethane foam impregnated with a thermosetting resin, and with a reinforcing layer of fiberglass. This type of construction is inefficient in mass production, and has low acoustical attenuation which is particularly undesirable for automobile headliners.

Other approaches have been to form a laminate of fiber reinforcing mat, such as a glass fiber mat on a fibrous core, and a second reinforcing mat on the opposite side. The exposed surfaces of the reinforcing mat are then coated with a resin and an outer cover stock applied. This laminate is then formed to a desired shape under heat and pressure, i.e., compression molding. Although this type of structure has somewhat improved acoustical characteristics, additional sound dampening is desired, particularly for luxury automobiles.

In the prior art, the fibrous layers of the laminates consist of fibers of relatively large and uniform denier or size. This parameter is critical to sound attenuation properties, and fibers of finer or smaller denier are required to achieve greater sound absorption. However, fine denier fibers in the range of 1.2 or less lack the resiliency required for retention of thermoformed shapes. Although resiliency can be achieved by impregnating the fibers with a resin, it is very difficult to impart an even distribution of resin into a fibrous batt containing fine denier fibers. In the prior art, extensive impregnation of the fibrous layers was not required due to the presence of the stiff reinforcing layers. Hence, given these trade-offs, a truly superior acoustical dampening headliner of sufficient strength could not be produced.

Although layers containing fiberglass have the desirable characteristics of strength and some sound attenuation, they have the undesirable traits of reflecting sound when made very hard or dense. Fiberglass, particularly in woven mat form, is also difficult to handle and is a known skin irritant. Because the production of headliners and similar panels using fiberglass is most commonly done manually, this is a significant problem which has not been addressed. Alternative fibers, natural and synthetic, have not been developed to be both cost effective and have strength comparable to glass.

SUMMARY OF THE PRESENT INVENTION

The present invention overcomes these and other disadvantages of the prior art, by providing a composite material laminated structure which has all of the desired physical properties, and an improved method of manufacture. In accordance with one aspect of the invention, there is provided a laminated structure having a core of polymeric fibers, a thermosetting resin impregnated into the core, and individual chopped fibers randomly applied to opposite sides of the core layer. A decorative layer is applied to an exterior side of the laminate, and an impervious film and finish scrim is applied to the opposite side of the core. The polymeric fibers of the core are bonded together by a thermoplastic binder system. A preferred method of bonding the fibers together is by a bicomponent fiber, in which an outer layer of fibers is a low melt temperature polymer, and an inner core layer of fibers is a polymer with a relatively higher melt temperature.

In accordance with another aspect of the invention, there is provided a laminate structure with enhanced sound absorption and structural properties having a central core having opposite sides and made of a combination of intertwined polyester fibers having differing deniers in an approximate range of 0.1 to 100, the combined fibers arranged with the core to form a layer of fibers of relatively small denier adjacent to a layer of fibers of relatively large denier, a resin applied to the core, structural fibers randomly attached to the opposite sides of the core by contact with the resin, at least some of the structural fibers being intertwined with the polyester fibers of the core, a low melt polymer web over the structural fibers on one of the opposite sides of the core, and a face cloth over the low melt polymer web, an impervious polymer film over the structural fibers on an opposite side of the core, and a scrim layer over the impervious polymer film.

And in accordance with another aspect of the invention there is provided a method of manufacturing a laminate structure which can be molded into a relatively rigid structure and which is effective at absorbing sound, the method including the steps of applying a thermoset resin to the fibrous core, providing a polymer film which has a melting temperature less than a melting temperature of the fibrous core adjacent to the fibrous core, putting a plurality of reinforcing non-woven fiber strands into contact with the polymer film and a first side of the fibrous core, positioning a fibrous core containing a plurality of intertwined polyester fibers of differing denier with a thermoset resin applied to the fibrous core in contact with the plurality of reinforcing non-woven fiber strands, putting a plurality of reinforcing non-woven fiber strands into contact with a second side of the fibrous core generally opposite to the first side, applying a polymer web over the fiber strands applied to the second side of the fibrous core, and applying a cover stock to the polymer web.

These and other aspects of the invention are herein described in particularized detail with reference to the accompanying Figures.

DETAILED DESCRIPTION OF PREFERRED AND ALTERNATE EMBODIMENTS

Figure 1:
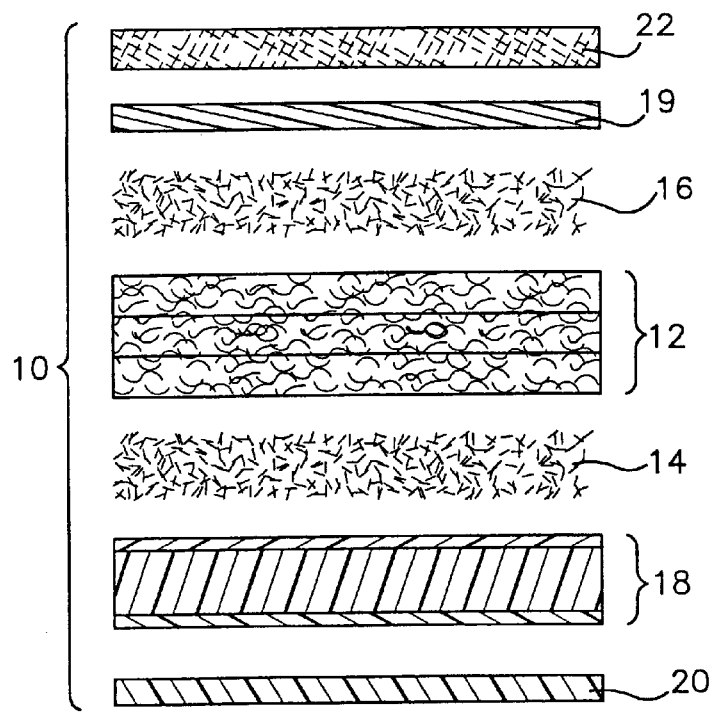
FIGS. 1 and 2 are schematic representations of the laminated structure of the invention.

As schematically represented in FIG. 1, the invention includes a laminate, collectively referenced at 10, made up of combined materials including a core 12 made of non-woven randomly intertwined polymeric staple fibers of differing deniers (or fineness as determined by weight per unit length) per filament, such as for example 0.9, 4.0, 15 and 45, and generally in a wide range from 0.1 to 100. Although these particular denier values are given as examples, the invention is not limited to these values. The more significant factor is that the deniers are combined in a widely varying range which has been determined by the inventors to provide the desired mechanical, bonding and acoustical properties. In other words, it is the combination of fibers of different deniers, rather than the specific denier values combined, which improves the properties of the laminate 10. In particular, it has been found that the fibers with relatively low deniers of, for example, 0.9, contribute substantially to the increased sound absorption of the core 12, and therefore in a preferred embodiment a substantial percentage of the fibers of the core are of relatively small denier such as 0.9.

The fibers range in length from approximately 0.5 inches to 3.0 inches, although other lengths may be used. The fibers are blended with a bicomponent fiber, such as which is utilized to effect adherence between the individual fibers when the core is combined with other layers of the laminate. As used herein, the term "bicomponent" generally refers to a fibers having an outer layer or sheath with a melting temperature which is relatively lower than a melting temperature of a core. This characteristic allows the fibers to bond to adjacent fibers or other materials in a thermal formation process, without altering the desired physical properties of the fiber core. The percentage content of the bicomponent fiber ranges from 10 to 100, and is preferably in the range of 40 percent.

The fibers of the core 12 are initially held together in for example a mat form by being intertwined by conventional textile blending equipment such as carding, needling, air laying or garnetting. The particular method of formation of the combined fibers in a mat form is selected to preferably produce a loft of approximately 150% of the finished part thickness for use in the laminate manufacturing process described herein.

Figure 2:
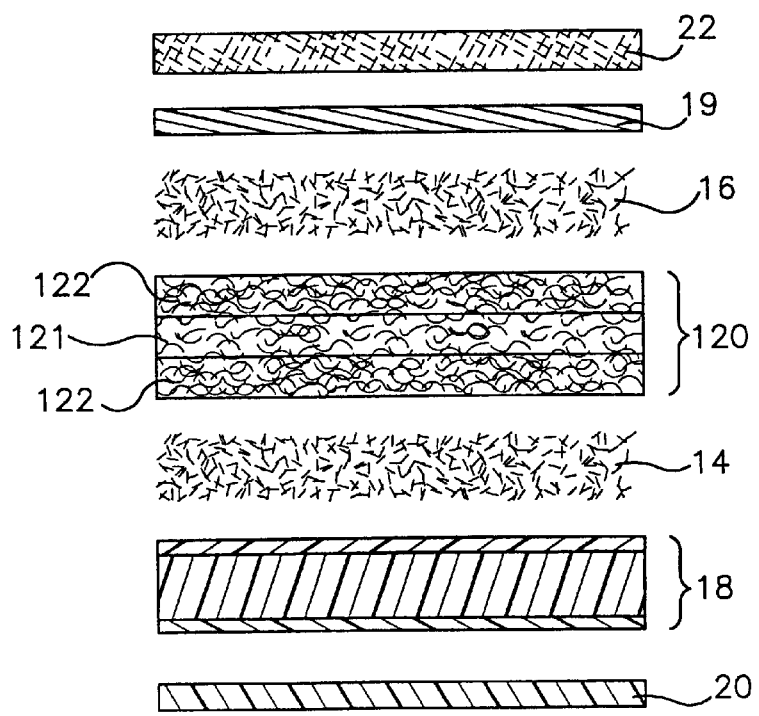

It has further been discovered that the sound absorption of the laminate 10 is further enhanced by creating a dual density/denier core 120, schematically depicted in FIG. 2, which can be used in place of a single fiber denier core 12. The core 120 includes a sublayer 121 which includes relatively fine denier fiber, preferably 0.9 denier, blended with, for example, 15 denier fibers and bicomponent fibers such as polyethylene terephthalate (PET). A second sublayer 122 adjacent sublayer 121 (and/or on both sides of layer 121 as shown) has generally larger fibers, such as for example 15 denier blended with 45 denier and bicomponent fibers creates a dual density/dual denier laminate core. The core 120 can be needled to impart sufficient strength, and/or passed through an oven to melt the outermost bicomponent fibers to give the core structural rigidity and strength.

The combined fibers of different deniers and the bicomponent fibers are more readily and effectively intertwined by needling than is a mass of fibers of the same denier. Because the fibers are adequately mechanically interconnected, there is no need to impregnate the core 12 with a binding agent such as a resin in order to form the core 12. However, in order to attach the other layers of the laminate 10 to the core 12, the individual fibers which male up the core 12 are preferably a thermoplastic polymer, such as polyethylene terephthalate (PET). These fibers may be virgin or manufactured from recycled product. The fibers are preferably crimped at a rate of from 1 to 30 crimps per inch, although straight fibers may also be used. Internal bonding of the fibers of the core 12 occurs when the fibers are heated by forced air or by a fixed heat source such as a heated mold.

Referring again to FIG. 1, the laminate 10 further includes structural reinforcement layers 14 and 16 which are fiber pieces chopped from rovings, preferably glass fiber rovings, having from 30 to 400 strands, with a strand thickness in an approximate range of 5 to 25 microns, and a specific gravity of approximately 2.5. In a manufacturing process further described below, the strands are fed into a glass chopper and cut to a length of between approximately 1 to 4 inches. After the fibers are fed through the chopper, they are allowed to fall at random onto the sides of the core 12 as further described below.

Alternatively, the reinforcement layers 14 and 16 may be constructed of continuous strands of continuous mineral fibers, such as Basalt. The individual strands would preferably have a thickness in an approximate range of 9 to 16 microns and specific gravity of approximately 2.9. The fibers would be processed (chopped) in a manner similar to the glass fiber rovings, with about 3 to 300 individual strands per roving.

Figure 3:
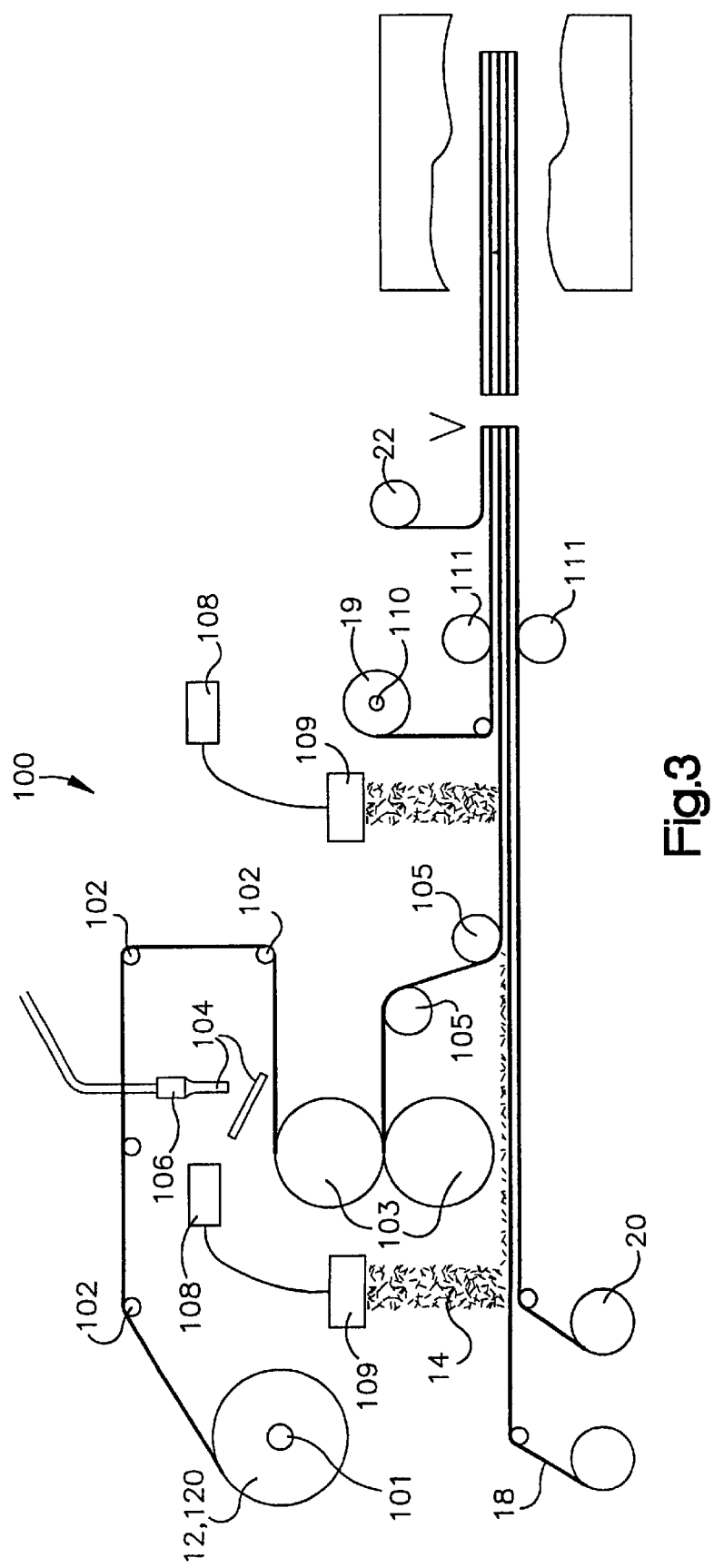
FIG. 3 is a schematic representation of a manufacturing set-up to produce the laminated structure of the invention in accordance with the method of manufacture of the invention.

With reference to FIG. 3, a method of manufacturing the laminate 10 is described. In an assembly line set-up indicated generally at 100, the core 12 (or 120) is fed from a spool 101 through a series of feed rollers 102 past a resin applicator 104 at which resin, supplied from a resin supply reservoir/dispenser 106, is applied to the major surfaces of the core 12. The core with resin applied then passes through upper and lower press rollers 103, and upper and lower guide rollers 105. Fiber rovings, such as relatively short individual glass fibers, and also referred to as "strands" 14 are supplied from roving reservoir 108 and randomly applied to polymer film layer 18, preferably in a random gravity-fed fashion such as sprinkled from an agitator tray or chopper 109 positioned over the core as it passes by. Alternatively, the fiber strands may be applied by manual distribution from a container, or cut from continuous strands directly above the core and allowed to fall randomly upon the core. The fiber strand rovings only partially adhere to the core upon contact with the resin applied to the surfaces of the core. As the resin-carrying core 12 passes lower guide roller 105, the lower side of the core comes into contact with the randomly oriented strands 14 carried on the upper surface of layer 18. Thereafter, reinforcing strands 16 are randomly applied to the upper side of the core 12 from chopper 109.

The low melt polymer web layer 19, fed from spool 110, is then applied over strands 16 on the upper (interior) side of core 12, and passes through nip rollers 111. The primary purpose of the web layers 18 and 19 is to contain the individual strands of the fibers of layers 14 and 16 until the laminate is nipped about the perimeter or otherwise self-contained such as by insertion into a mold. Therefore, it is desirable that the web layers 18 and 19 melt out in the forming process so as not to affect the structural properties of the completed laminate. A preferred material for the web layers 18 and 19 is a polyamide web, such as Spunfab PA1008.

As shown in FIG. 1, the web layer 18 is preferably a multi-layer impervious low melt polymer film applied to the inner side of the core 12, between the chopped fiber strands and an internal scrim layer 20. The purpose of web layer 18 is to prevent any resin from reaching the scrim layer 20 and to thereby retain the resin within the laminate. A preferred material for web layer 18 has a polyethylene core, and outer layers of a polymer with a low melting point which bonds by melting to the scrim layer 20 on one side, and to the fiber strands of layer 14 on the other side. The scrim layer 20 is constructed from either a woven or needled/punched product and facilitates bonding and installation of the laminate 10, for example in the interior of a vehicle.

After the web 19 is applied, a cover stock 22 is applied from spool 23 over web 19 to complete the laminate structure, after which it may be cut and molded as shown. The cover stock 22 is decorative and covers the exposed surface of the laminate 10, such as the interior side of an automobile headliner. It is typically constructed of a knit textile with a polymer base, such as nylon or polyester. The cured resin serves to bond the cover stock 22 to the fiber reinforcing layer. In installations where a soft feel to the cover stock 22 is desired, a layer of foam may be pre-attached to the internal side of the cover stock.

The resin used to impregnate the core 12 is an elastomeric thermosetting resin, preferably a curable urethane of approximately 100 parts by weight of a polyol having three or four hydroxly groups, 70 to 95 parts by weight of an isocyanate compound having at least two reactive isocyanate groups, with diphenelmethane diisocyanate (MDI) being preferred; approximately 0.00 to 0.15 parts of a catalyst such as an amine or metal complex; approximately 0 to 20 parts of an appropriate blowing agent; and 0 to 5 parts of a suitable surfactant. An example of one type of suitable resin system is a blend of Voranl 446 and Papi 4027 from Dow Chemical Co.; Dabco from Air Products, Inc.; water, and DC-193 from Dow Corning. The amount of resin applied varies according to the density of the fiber core. A preferred approximate ratio of resin to fiber density is 1.2 to 1.

Referring again to FIG. 3, the scrim layer 20 and impervious film layer 18 are unwound in unison from respective spools and fed under roving choppers 109 for random distribution of the chopped fiber strands 14. The core 12 is fed at the same rate as the scrim layer 20 and the impervious film layer 18. The resin is applied by continuous coating such as roll coating, knife over roll, spray or curtain. A preferred method of coating for manufacture of the described laminate structure is to apply the resin to a coater blade 104 from the resin reservoir or nozzle 106 at a rate sufficient to maintain a small layer of resin on the blade. The tangential application angle of the blade relative to the direction of travel of the core 12 is critical to the amount of resin imparted into the core 12. The preferred application angle range is from 10 degrees to 80 degrees, with 35 degrees the most preferred angle.

The distance from the coating blade 104 to the top nip roller 103 is also critical to the resin impregnation of the core 12. This distance ranges from 10% to 100% of the thickness of the core, with 40% the most preferred distance. The coated core is then fed through the upper and lower nip rollers 103 to evenly distribute the resin into the core. The gap in the nip rollers is adjusted to adequately drive the resin into the pad. This gap ranges from 1% of the core thickness to 90% of the core thickness.

Subsequent to the nip process the core 12 is laid onto the randomly oriented fiber strands 14 previously applied to film layer 18. The product then passes under the second fiber chopper 109 where the fiber rovings 16 are cut to length and randomly distributed onto the impregnated core. The fibers are oriented to the plane of the core 12 at an infinite number of angles. Some of the fibers become intertwined with the core 12.

The low melt polymer web 19 is laid onto the chopped fibers and the product is then fed into a second set of nip rollers 111. The second set of nip rollers serves to coat the resin around the fiber reinforcing strands. After the nip, the cover stock 22 is unrolled onto the pad. The product is then cut to length and can be fed into a mold (not shown) having the desired contours to which the laminate is to be formed. As is known in the art, the mold is heated to a temperature sufficient to set the thermosetting resin, and sufficient to melt the polymer layers of the polymer web 19. Pressure is applied to compress the laminate to conform to the internal configuration of the mold.

Although the invention has been shown and described with reference to certain preferred and alternate embodiments the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of manufacturing a laminate structure which can be molded into a relatively rigid structure and which is effective at absorbing sound, the method comprising the steps of:

providing a fibrous core containing a plurality of intertwined polyester fibers of differing denier and applying a thermoset resin to the fibrous core, providing a polymer film which has a melting temperature less than a melting temperature of the fibrous core adjacent to the fibrous core, putting a plurality of reinforcing non-woven fiber strands into contact with the polymer film and a first side of the fibrous core, putting a plurality of reinforcing non-woven fiber strands into contact with a second side of the fibrous core generally opposite to the first side, applying a polymer web over the fiber strands applied to the second side of the fibrous core, and applying a cover stock to the polymer web.

2. The method of claim 1 wherein the fibrous core, polymer film, and polymer web are placed in a generally co-planar arrangement by being unfurled from spools, and the nonwoven fiber strands are placed in contact with the polymer film and fibrous core by random distribution.

3. The method of claim 1 further comprising the steps of applying the thermoset resin to the fibrous core by use of a resin dispensing mechanism and a coating blade, passing the fibrous core with thermoset resin through a first set of nip rollers prior to contact of a first side of the fibrous core with the fiber strands.

4. The method of claim 1 further comprising the step of passing the fibrous core with the thermoset resin, fiber strands on the first side of the fibrous core and polymer film, and fiber strands and polymer web on the second side of the fibrous core through a second set of nip rollers prior to application of the cover stock to the second side of the fibrous core.

5. The method of claim 1 wherein the fiber strands are applied to the polymer film and fibrous core by random distribution from a chopping mechanism operative to chop fiber rovings into strands.

* * * * *